United States Patent
Carceroni et al.

(10) Patent No.: US 9,479,694 B2
(45) Date of Patent: Oct. 25, 2016

(54) SYSTEMS AND METHODS FOR AUTONOMOUSLY GENERATING PHOTO SUMMARIES

(71) Applicant: Google Inc., Mountain View, CA (US)

(72) Inventors: Rodrigo Lima Carceroni, Mountain View, CA (US); Marius Renn, San Jose, CA (US); Alan Newberger, San Francisco, CA (US); Sascha Häberling, San Francisco, CA (US); Jacob Mintz, Mountain View, CA (US); Andrew Huibers, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/526,355

(22) Filed: Oct. 28, 2014

(65) Prior Publication Data

US 2016/0119536 A1   Apr. 28, 2016

(51) Int. Cl.
*H04N 5/232* (2006.01)
*G06K 9/00* (2006.01)
*G06F 17/30* (2006.01)

(52) U.S. Cl.
CPC .... *H04N 5/23222* (2013.01); *G06F 17/30781* (2013.01); *G06K 9/00744* (2013.01); *G06K 9/00751* (2013.01); *H04N 5/23245* (2013.01)

(58) Field of Classification Search
CPC .................................................. H04N 5/2625
See application file for complete search history.

(56) References Cited

U.S. PATENT DOCUMENTS

| | | | |
|---|---|---|---|
| 5,576,950 A | 11/1996 | Tonomura et al. | |
| 7,003,154 B1 | 2/2006 | Peker et al. | |
| 8,111,297 B2 * | 2/2012 | Nitta | H04N 5/772 348/208.13 |
| 8,736,716 B2 * | 5/2014 | Prentice | H04N 5/23238 348/220.1 |
| 2004/0075750 A1 * | 4/2004 | Bateman | H04N 5/907 348/231.1 |
| 2011/0043639 A1 * | 2/2011 | Yokohata | H04N 5/232 348/169 |
| 2011/0293018 A1 | 12/2011 | Deever | |
| 2012/0257071 A1 * | 10/2012 | Prentice | H04N 5/2625 348/220.1 |

OTHER PUBLICATIONS

PCT/US2015/057466 International Search Report and Written Opinion Mailed Feb. 12, 2016.

* cited by examiner

*Primary Examiner* — James Hannett
(74) *Attorney, Agent, or Firm* — Troutman Sanders LLP; James E. Schutz; Scott D. Barnett

(57) ABSTRACT

Implementations of the disclosed technology include techniques for autonomously collecting image data, and generating photo summaries based thereon. In some implementations, a plurality of images may be autonomously sampled from an available stream of image data. For example, a camera application of a smartphone or other mobile computing device may present a live preview based on a stream of data from an image capture device. The live stream of image capture data may be sampled and the most interesting photos preserved for further filtering and presentation. The preserved photos may be further winnowed as a photo session continues and an image object generated summarizing the remaining photos. Accordingly, image capture data may be autonomously collected, filtered, and formatted to enable a photographer to see what moments they missed manually capturing during a photo session.

20 Claims, 13 Drawing Sheets

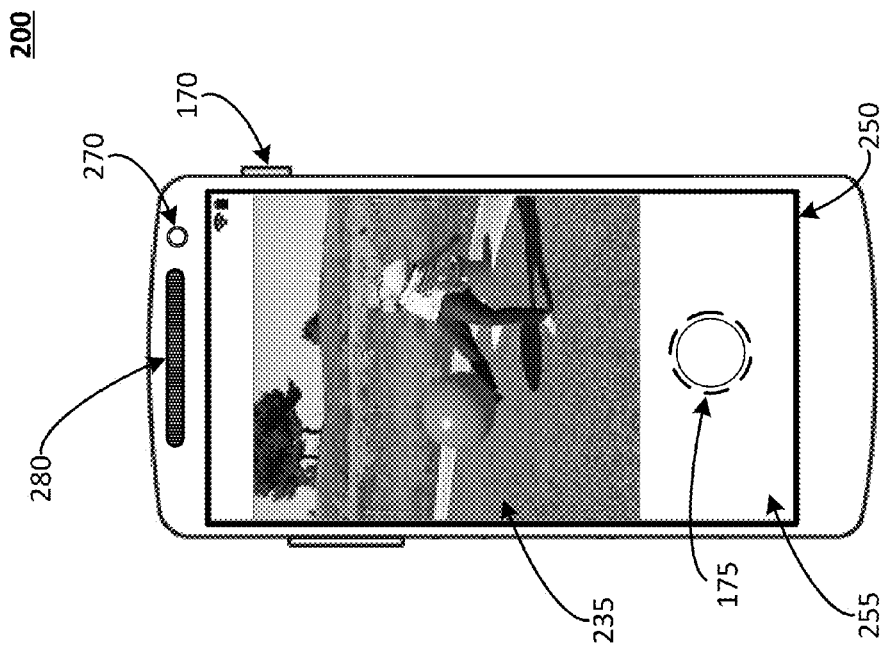
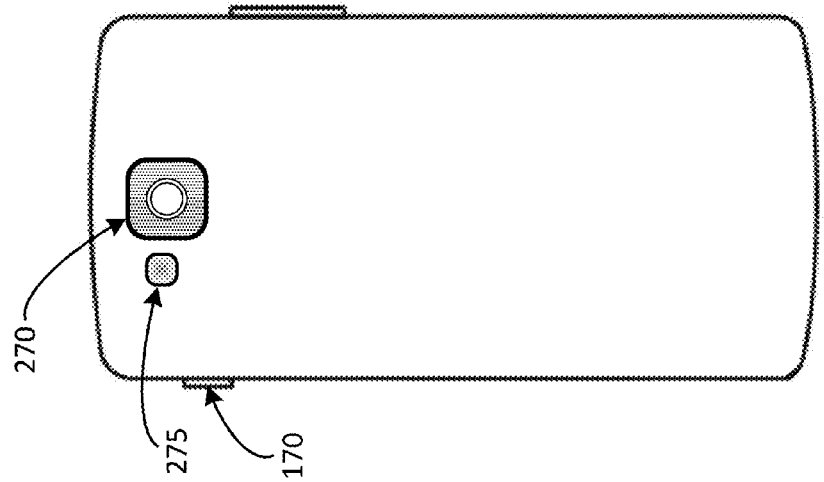
FIG. 2

FIG. 3
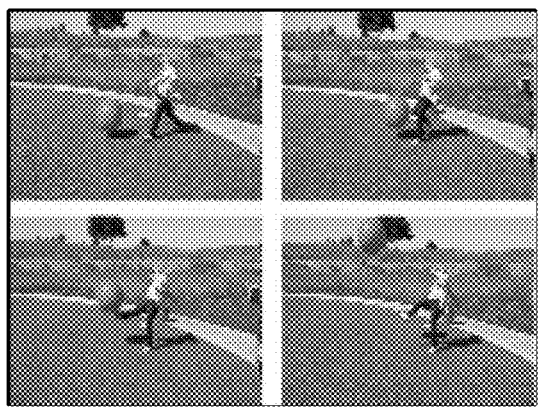
300A Collage
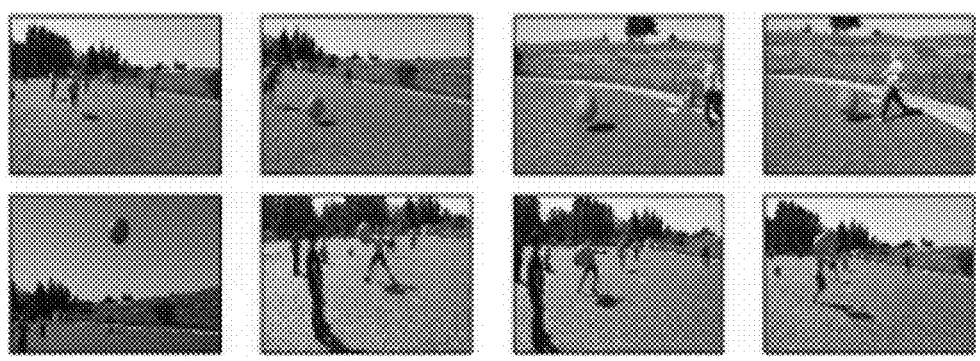
300B Stack

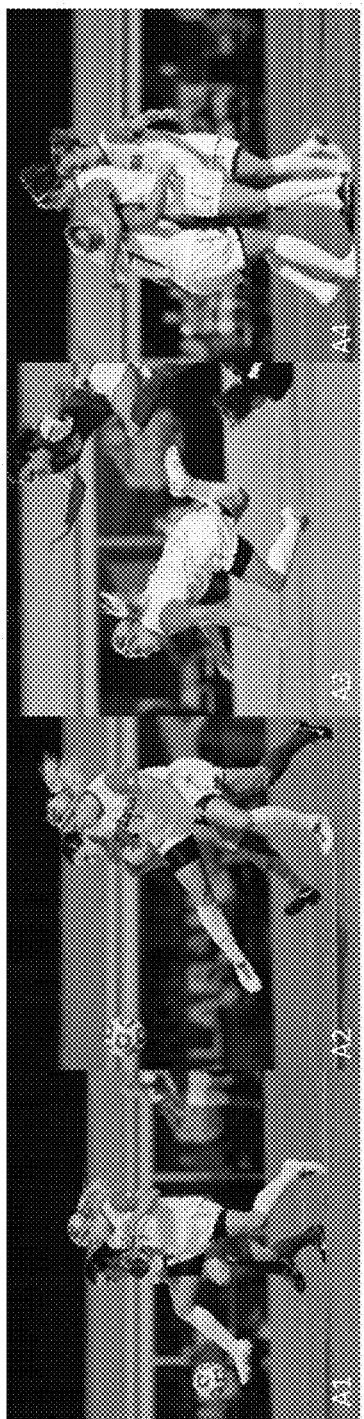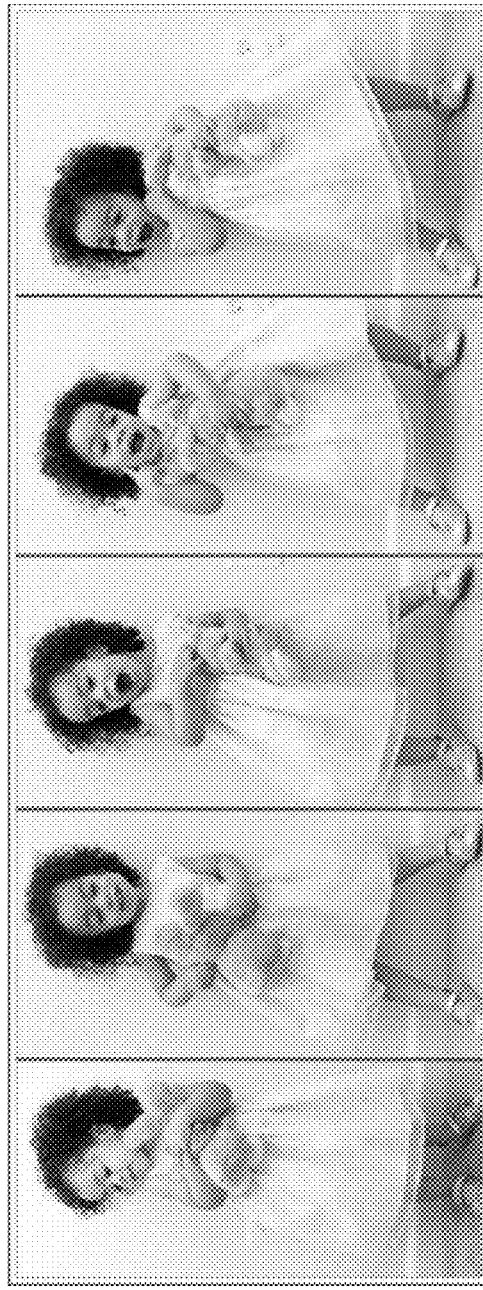
FIG. 7

SYSTEMS AND METHODS FOR AUTONOMOUSLY GENERATING PHOTO SUMMARIES

BACKGROUND

While waiting for ideal conditions in which to capture a photograph, several additional moments worth capturing in a photograph may pass in front of a photographer. The photographer, however, may be so focused on capturing a desired scene that she misses capturing these interstitial moments. Camera features such as continuous shooting (referred to as "burst mode" herein) may aid photographers in capturing a desired scene by rapidly snapping a series of photos. However, burst mode can quickly fill up the limited on-device storage of a camera, and manually reviewing the resulting sequence of captured photos to select an ideal candidate can be time consuming and unwieldy. Another technique for capturing an ideal scene for a photograph is to shoot a video and extract a frame from the video for use as a still image, but capturing and manipulating video data may present even more severe issues with storage space and image curation.

SUMMARY

Some or all of the above deficiencies may be addressed by certain implementations of the disclosed technology. Certain implementations include techniques for autonomously collecting image data, and generating a content summary based thereon.

According to an example implementation, a method is provided. The method may include, receiving, by a computing device, from an image capture device operatively coupled to the computing device, a live stream of image data. The live stream of image data may be received responsive to activating an image-capture application, or while a live-preview of the stream of image data is active. The method may further include storing a set of images from the stream of image data and storing the set of images in a first buffer. The set of images may be sampled autonomously by the computing device from the live stream of image data based on a variable sampling rate. That is, no user prompting may be required to direct the sampling from the stream of image data. The method may yet further include selecting, by the computing device, a subset of images from the first buffer. The subset of images may be selected based on determining an indication of one or more predetermined features among the subset of images. The method may still yet further include generating, by the computing device, based on the subset of images, an image object representing a summary of the stream of image data. The method may also include outputting, by the computing device, for display at the display device, an indication of the image object.

According to another example implementation, a computer program product is provided. The computer program product may include a non-transitory computer readable medium. The computer readable medium may store instructions that, when executed by at least one processor in a system, cause the processor to perform a method substantially similar to the methods described hereinabove.

According to yet another example implementation, a system is provided. The system may include an image capture device in communication with a computing device, and a memory operatively coupled to the computing device and configured for storing data and instructions that may be executed by the processor. When executed, the system may be caused to perform a method substantially similar to the methods described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 2 depicts a schematic diagram of a smartphone computing device 200, according to an example implementation.

FIG. 3 depicts illustrations of photo session summaries 300A-B, according to an example implementation.

FIG. 7 depicts illustrations of manually curated photo session summaries 700A-B, according to an example implementation.

DETAILED DESCRIPTION

Figure 1:
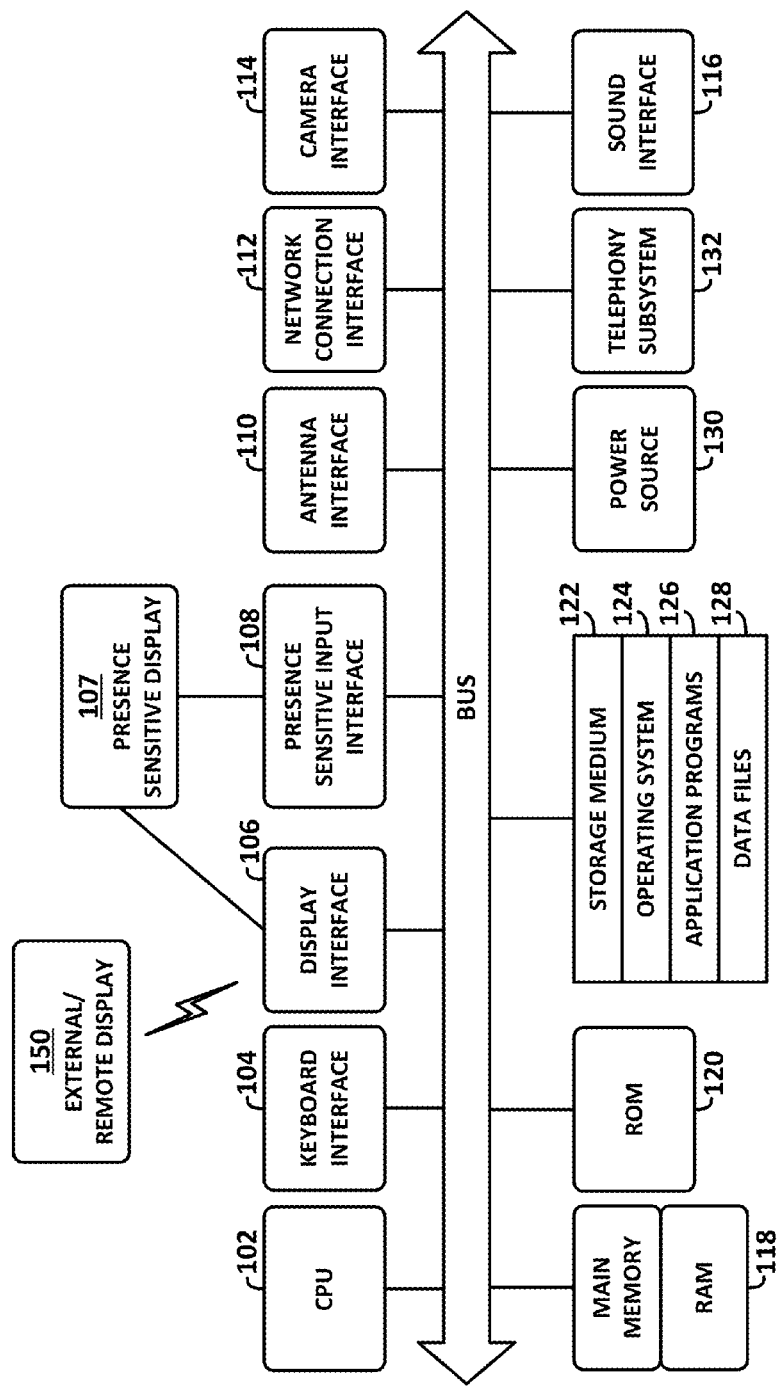
FIG. 1 depicts a schematic diagram of illustrative computing device architecture 100, according to an example implementation.

Implementations of the disclosed technology include techniques for autonomously collecting image data and generating photo summaries based thereon. In some implementations, a plurality of images may be autonomously sampled from an available stream of image data. For example, a camera application of a smartphone or other mobile computing device may present a live preview based on a stream of data from an image capture device. The stream of image capture data may be sampled and the most interesting photos preserved for further filtering and presentation. In another implementation, a camera application may, with or without direction from a human user, autonomously capture images while the camera application is active at a computing device. A subset of the captured images may be preserved and curated to select the most interesting photos as determined based on one or more image analysis methods. Accordingly, image capture data may be autonomously collected, filtered, and formatted to enable a photographer to see what moments they were unable to manually capture during a photo capture session.

In some implementations, a rate of image data stream sampling or undirected image capture may be based on a running measure of detected photo interestingness. For example, an image data stream sampling rate may be adjusted responsive to detecting increased motion in recently sampled images. Thus, image data stream sampling may be dynamically calibrated to be more aggressive when photos that depict action are more likely to be collected.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for autonomously collecting image data and generating photo summaries based thereon, and will now be described with reference to the accompanying figures.

FIG. 1 depicts a block diagram of illustrative computing device architecture 100, according to an example implementation. Certain aspects of FIG. 1 may be embodied in a computing device (for example, a mobile computing device 200 as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts a schematic diagram of a smartphone computing device 200, according to an example implementation. As shown in FIG. 2, the computing device may be a mobile computing device, for example, a smartphone or a tablet. The mobile computing device may have a built-in or integrated display 250 for presenting a graphical user interface (GUI) of a camera application 255. As referred to herein a camera application may be embodied in one or more of software, hardware, or firmware. The GUI of the camera application may include one or more controls including a camera shutter button 175.

The display 250 may be combined with a presence sensitive input device to form a touch-sensitive or presence-sensitive display for receiving user input from a stylus, finger, or other means of gesture input. Accordingly, the camera application may receive user input through the presence-sensitive display, such as an activation of the camera shutter button. The mobile computing device may also have one or more physical buttons 170 for triggering capture of an image. In some implementations, the mobile computing device may also include or be associated with a sound producing device 280, such as a speaker, piezoelectric buzzer, or the like.

The mobile computing device 200 may be in communication with an image capture device 270 for capturing single images or video. As shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In certain implementations, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc. A camera application may refer to one or more of software, firmware, or hardware configured to operate an image capture device.

Certain implementations of the disclosed technology include techniques for autonomously collecting image data and generating photo summaries based thereon. Some implementations may automatically present a photographer with photos or a burst of photos that depict some interesting action they may have missed manually capturing. Such systems methods and computer-program products may be referred to herein as "Smart Burst."

A concept underlying certain implementations of Smart Burst is that, due at least to processing power and space constraints, a camera application intended to automatically capture missed photos during a photo session may not be able to capture frames continuously and indiscriminately. Moreover, the capture of large number photos makes manual review and curation of photos time-consuming and unwieldy. Instead, certain implementations may perform real-time sampling and preservation of frames that are most likely to be interesting or useful to a user. Thus, a user may be spared from having to winnow through an inordinate amount of images to find quality photos.

Additional processing may be performed on the sampled frames to generate automatically a diverse and comprehensive summary of action. In some implementations, the summary may be formatted according to characteristics of the photo content. For example, a stack of frames may be presented for sampled photos exhibiting general motion or high sharpness; an animated .gif may be presented for sampled photos exhibiting considerable specific motion or blurriness. See for example, FIG. 3, which depicts illustrations of two photo session summaries 300A-B, according to an example implementation.

According to certain implementations, image data may be collected by sampling frames from an available stream of image data. For example, a camera application 255 of a smartphone or other mobile computing device 200 may present a live preview 235 based on a stream of data from an image capture device 270. A plurality of photos may be sampled from the corresponding live stream of image data and a subset of the most interesting photos saved for later presentation. In another implementation, Smart Burst may initiate, without direction from a human user, capture of a stream of images by an image capture device 270. Thus, a stream of images may be obtained even if a live preview is not presented by the camera application.

Figure 4:
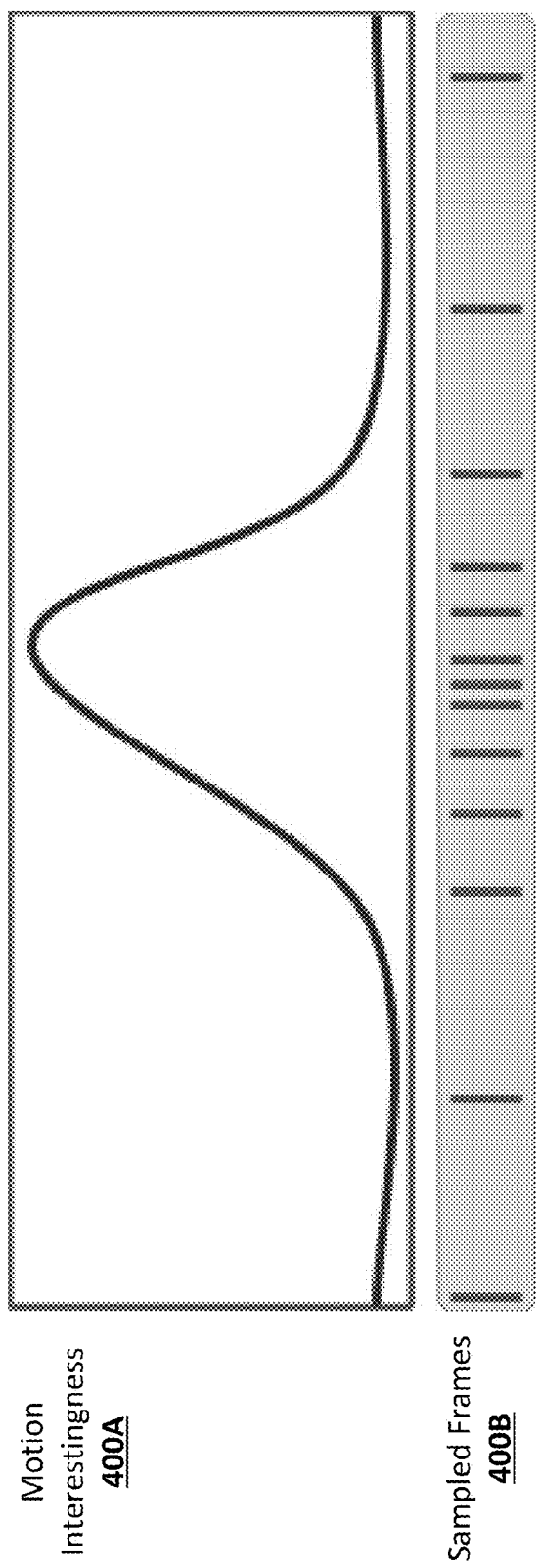
FIG. 4 depicts an illustration of a motion-interestingness curve 400A and corresponding image-capture sample rate 400B, according to an example implementation.

FIG. 4 depicts an illustration of a motion-interestingness curve 500A and corresponding image-capture sample rate 500B, according to an example implementation. According to certain implementations, a custom real-time motion interestingness signal may function as a baseline for real-time frame sampling or capture. For example, frame sampling may be performed with a frequency proportional to an area under a motion-interestingness curve 500A. In other words, the more interesting the motion detected in recently sampled images, the higher the frequency of sampling of subsequent images. However, when a level detected motion lessens, the sampling rate may slow to reduce processing and storage costs. Thus, the sampling rate may be dynamically calibrated based on the running motion-interestingness measure.

In some implementations, an indication that Smart Burst is active may be provided through the camera application. For example, an icon or widget may be displayed in the GUI of the camera application, or a sound may be produced to indicate a frequency of sampling. Accordingly, a user may be provided with feedback of how interesting Smart Burst considers a current scene in front of the camera.

According to certain implementations, another level of filtering may select the more interesting photos from the sampled frames. In some implementations, the more interesting individual photos may be determined based on a metric of static photo quality. The metric may be computed from a combination of properties of an individual frame, including, but not limited to blurriness, presence of faces, facial expressions, illumination quality, image saliency and various color diversity metrics. In some implementations, a frame may be reduced in resolution or otherwise altered to make the static photo quality determination less resource intensive. In an example implementation, the determination may be made based on a reduced-resolution copy of a photo, with the original frame preserved if the copy is deemed interesting enough.

According to certain implementations, after a photo session has concluded or the camera application otherwise determines a user would like to view interesting missed photos, Smart Burst may perform yet another photo selection. When Smart Burst is configured to output a single missed photo, an optimization of the quality of the selected frame may be performed. Where the desired output is a multi-picture artifact such as an animated gif, a collage of pictures, or a stack of frames, the final optimization process may involve removal of near duplicates or, more generally, joint maximization of a quality and diversity of the selected frames before the final output artifact is assembled. Various techniques for maximizing the quality or diversity of a content summary are known in the art and not discussed at length herein.

Figure 5:
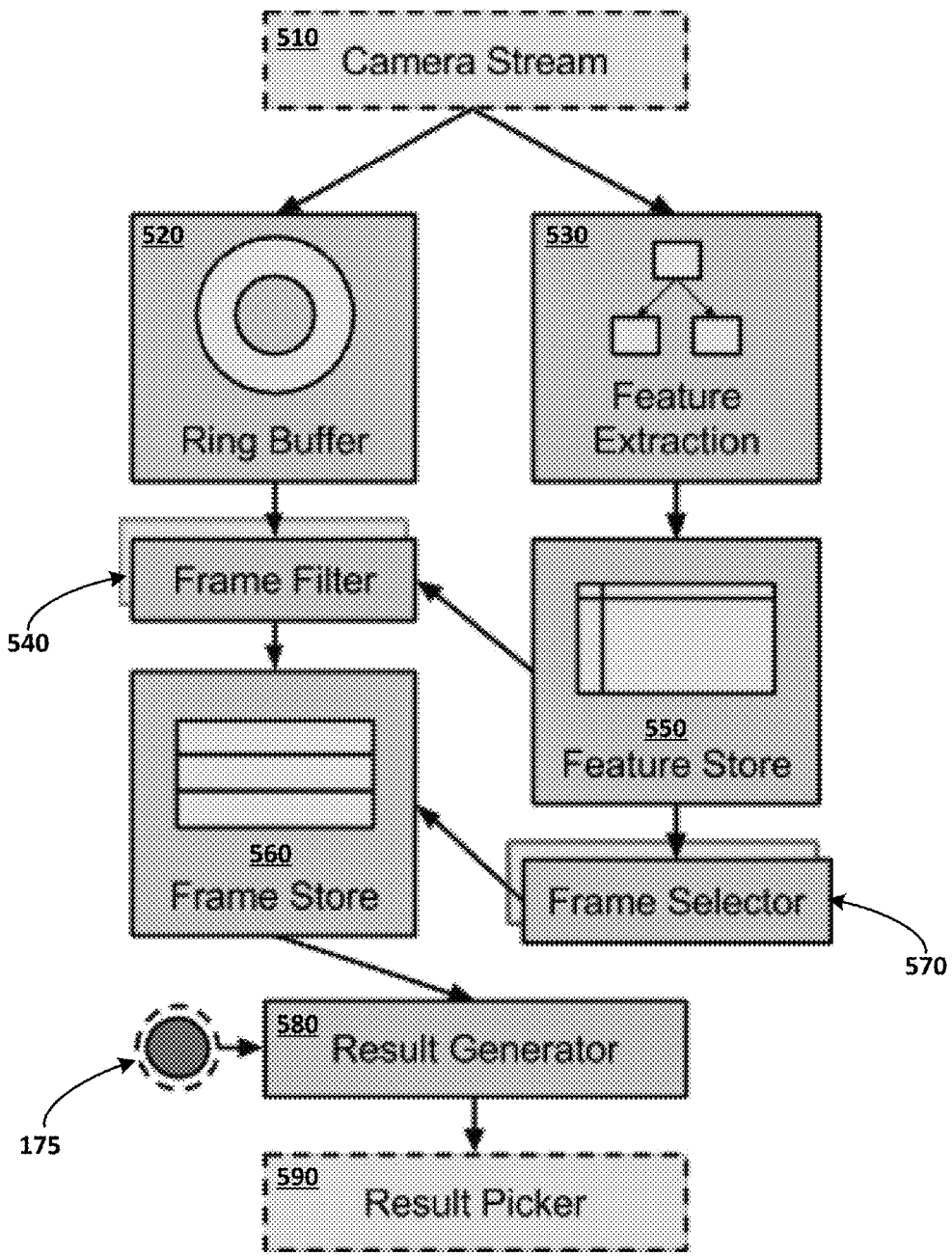
FIG. 5 depicts a block diagram 500 of how Smart Burst components may be integrated with or within a camera application 255, according to an example implementation.

FIG. 5 depicts a block diagram 500 of how Smart Burst components may be integrated with or within a camera application 255, according to an example implementation. According to certain implementations, Smart Burst may sample frames from an available image stream such as a Camera Stream 510. In some such implementations, Smart Burst may assume that a Camera Stream exists that serves camera frames. In some implementations, a camera application 255 may provide a live preview 235 based on the Camera Stream. The Feature Extraction module 530 may subscribe to the Camera Stream, and send extracted features to the Feature Store 550.

A buffer 520 may also subscribe to the Camera Stream. In some implementations, the buffer may be a "ring" or "circular" buffer. Accordingly, the buffer may store the last n timestamped frames. Thus the size of the buffer may be fixed to constrain storage use. When a frame is about to be evicted from the Ring Buffer 520, it may be sent to one or more Frame Filters 540 that filter out any unnecessary frames. A frame may be deemed unnecessary if it's static photo quality is below a certain threshold, or if the frame does not contain any interesting features as determined during Feature Extraction.

The remaining filtered frames may be then inserted into a Frame Store 560. In some implementations, this store may be limited in size, and communicate with Frame Selector 570 to determine which frames to evict from the store when capacity is reached. A goal of the Frame Selector 570 is to drop frames in a way that ensures the Frame Store always contains a good summary of the image stream contents. Thus, unlike a FIFO structure like the Ring Buffer 520, frames are not necessarily dropped in order of insertion, but according to how important a frame is to the summary.

Figure 11:
FIGS. 11-13 depict autonomously generated photo session summaries 1100 1200 1300, according to an example implementation.
Figure 12:
Figure 13:
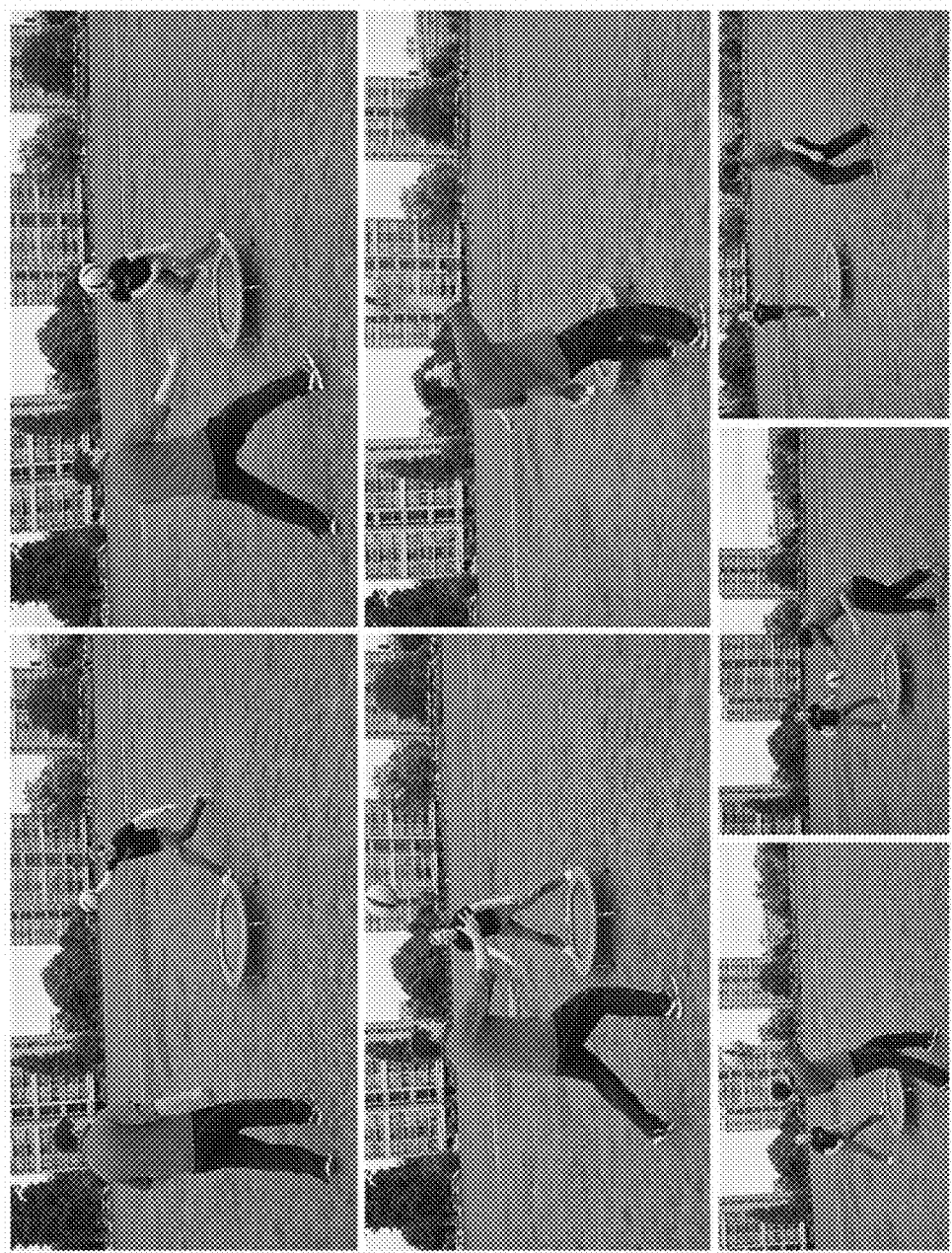

According to certain implementations, when it is determined a user is ready to review missed photos, the contents of the Frame Store 560 may be analyzed and a resulting image object (e.g., an animated .gif, a stack of frames, or collage) summarizing the stream may be generated by the Result Generator 580. For example, FIGS. 11-13 depict autonomously generated photo session summaries 1100 1200 1300, according to an example implementation.

In some implementations, multiple summaries may be generated. For example, two or more of a single selected summary frame, a multi-frame collage, and an animated .gif representation may be generated based on the same images in the Frame Store. Accordingly, a user may be presented with both summaries, and allowed to choose between them by the Result Picker 590.

In some implementations, Smart Burst may activate responsive to a camera application 255 being launched or becoming active at a mobile computing device 200. In another implementation, Smart Burst may activate responsive to a stream of images becoming available. For example, Smart Burst may activate when a live preview of a camera application is active. In yet another implementation, Smart Burst may activate responsive user interaction with the GUI of the camera application. For example, Smart Burst may activate responsive to a user input at the shutter button 175 of the camera application. Smart Burst may also deactivate responsive to a second user input at the shutter button. Accordingly, a photo summary may be generated including content that was missed between the manual capture of two photos. In still yet another implementation, Smart Burst may be activated or deactivated by a dedicated button or UI widget.

Figure 6:
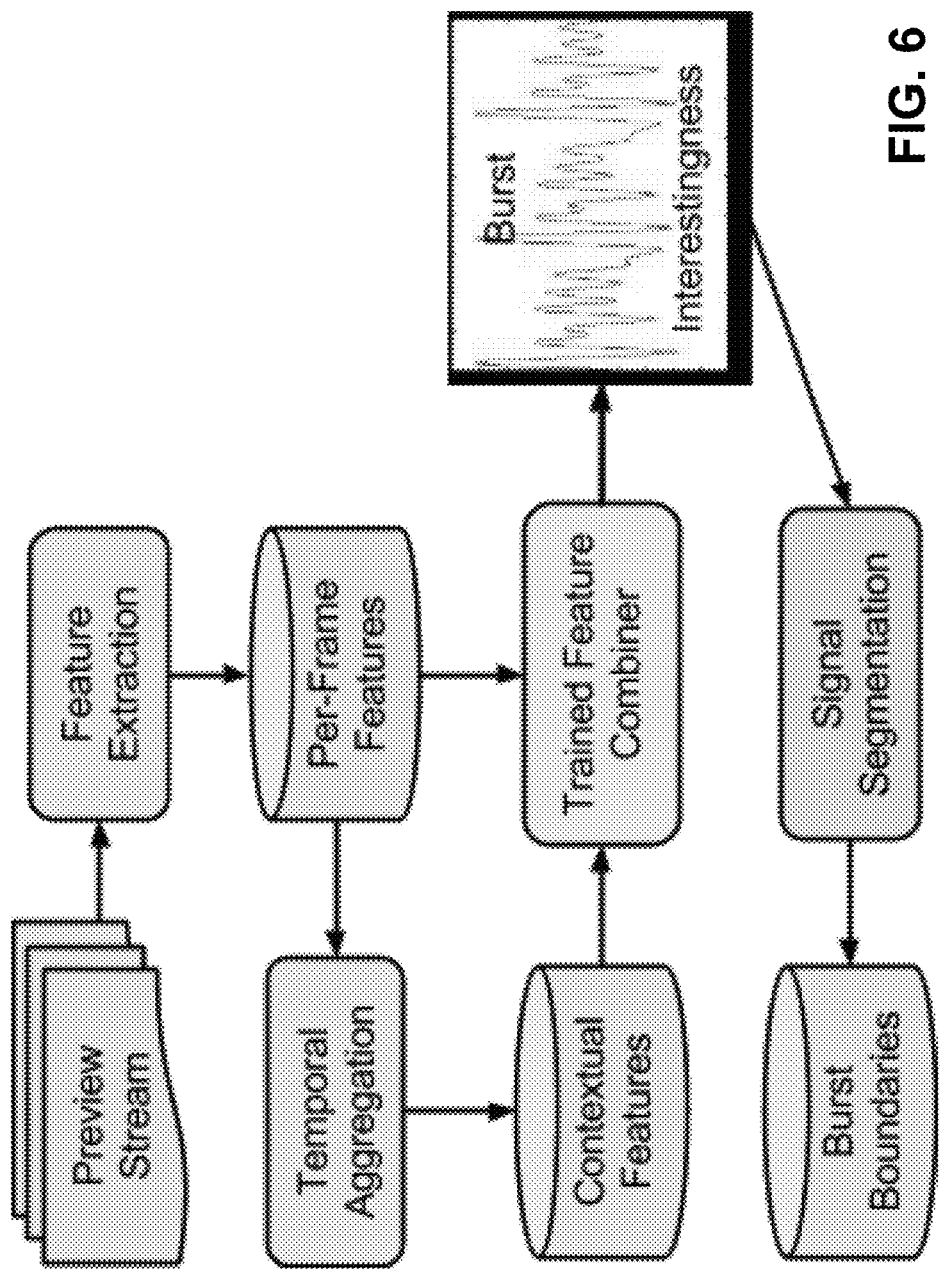
FIG. 6 depicts a block diagram 600 of determining a motion interestingness metric, according to an example implementation.

FIG. 6 depicts a block diagram 600 of determining a motion interestingness metric, according to an example implementation. One problem addressed by certain implementations of Smart Burst is how to rate frames with regards to motion interestingness. In some implementations, Smart Burst may use one or more of a first metric for salient motion (e.g., based on heterogeneous motion detected among center-surround regions of a grid of cells) and a second metric for explicitly tracking interest regions. Another possible trigger for adjusting a sampling rate may be detected motion of tracked faces and temporal variations in facial expressions. Smart burst may take into account some or all of these signals to generate a Motion Interestingness Metric, as shown in FIG. 6.

According to certain implementations, Smart Burst may output a single photo or frame that a photographer missed manually capturing. However, a single photo may not be enough to summarize missed action satisfyingly, especially for prolonged periods of photographer inactivity. Thus, some implementations may present a summary based on multiple frames. However, presenting users with a stack of forty frames they must manually pick from may be as unsatisfying as providing only a single best missed shot.

A better output may be something like the manually curated set of frames shown in FIG. 7, 700A, which captures multiple important stages of the action in a concise way. Note that the sampling and of important frames may be in non-uniform in time, for example, with the temporal gap between the frames A1-A2 being much smaller than the gap between frames A2-A3, which in turn is also much smaller than the gap between frames A3-A4.

According to certain implementations, a strong solution should take into account at least some the following factors:

Dynamic quality: Was interesting/dramatic action taking place at the moment when this particular frame was taken? Instances of more dramatic action should ideally be more densely represented than instances of less dramatic action, as shown in sequence 700A.

Static quality: Are the individually selected frames, when considered in isolation, good quality pictures, both photometrically (i.e., in terms of blurriness, noise, illumination quality, etc.) and content-wise (i.e., in terms of faces, facial expressions, objects present, location of tracked interest regions, framing, visual saliency distribution, color diversity, etc.). The third frame A3 in the sequence 700A may be an example of a photo with good static quality; it shows the main subjects of the action more clearly than any of the other frames.

Diversity and coverage: Is each selected frame adding important information to the final set of selected frames; and conversely, are all important aspects of the action covered by at least one of the selected frames? In sequence 700A, the last frame A4 may not represent exciting action in and of itself. However, inclusion of the frame in the summary may be warranted because the frame's content is significantly different from the other frames in the sequence. In this instance, the frame adds a new piece of information about the action, i.e., after the goal, there was a celebration.

Figure 8:
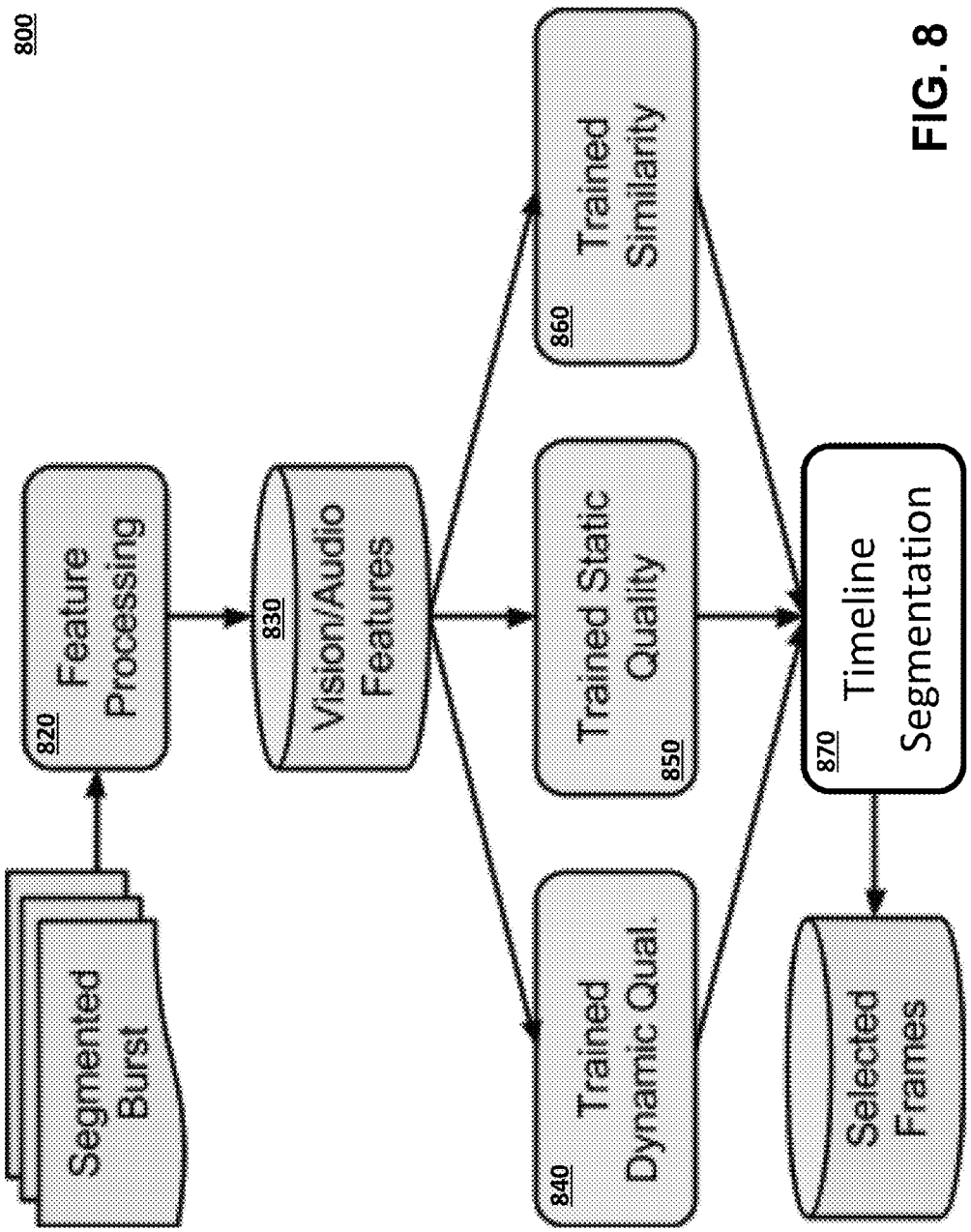
FIG. 8 depicts a flow diagram 800 of the combining of quality optimization metrics, according to an example implementation.

According to certain implementations, joint optimization may be performed on all or some of these aspects. In some implementations, a dynamic quality model and a static quality model were trained for individual frames in bursts. FIG. 8 depicts a flow diagram 800 of the combining of quality optimization metrics, according to an example implementation. As shown in FIG. 8, a plurality of frames, for example, frames sampled during a detected period of high-motion, may enter feature processing 820. Vision or audio features may be extracted and passed to various classifiers 840 850 860. Some or all of the classifiers may be trained by machine learning to assess a quality of one or more frames. In some implementations, the Static Quality 840 classifier may assess a single frame for static features. The Dynamic Quality 850 classifier may assess groups of frames. The Similarity Qualifier 860 may assess pairs of frames.

In some implementations, Timeline Segmentation 870 analysis may be performed. Timeline segmentation may minimize a specified cost function E(n), the cost of segmenting the first n frames into multiple clusters. Each cluster may be composed of consecutive frames. A dynamic programming algorithm may be used to solve this problem, since the problem has the characteristics of optimal substructure, i.e., once computed the optimal segmentation has been computed of the first n frames, that partial segmentation may stay the same regardless how later frames are segmented. In an example implementations, the computation of E(n) may be defined recursively as:

$$E(n)=\min\_{m \in (0,n-1)}\{E(m)+C(m,n)\} \text{ for } m \text{ in } (0,n-1)$$

where C(i,j) is the cost to create a new cluster from frame_i to frame_j. C(i,j) is the sum of the content-dependent cost of creating a new cluster boundary B(i, j) and a fixed penalty for adding a new cluster. The current boundary cost function B(i, j) is a weighted sum of two terms: (a) the least squares residual of fitting two lines to the dynamic quality values in the range, and (b) the inverse of the similarity between frames i and j. This cost function encourages creation of cluster boundaries between regions where the dynamic quality curve is flat and regions where the dynamic quality curve increases or decreases suddenly.

FIG. 7, 700B depicts another manually curated picture collage, according an example implementation. As shown in 700B, many of the more effective use cases for Smart Burst are those instances where one or a few main subjects move in the field of view of the image capture device. In such cases, the output sequence may likely be packaged into a composite picture that highlights the main subject(s), as in 700B. For generating such image objects, the following post-selection steps may be helpful:

Align and crop the selected frames, so as to keep the relevant regions well framed;

Color match the selected frames, to eliminate spurious variations; and

Assemble the selected frames into an optimum layout.

Experimental Results

Figure 9:
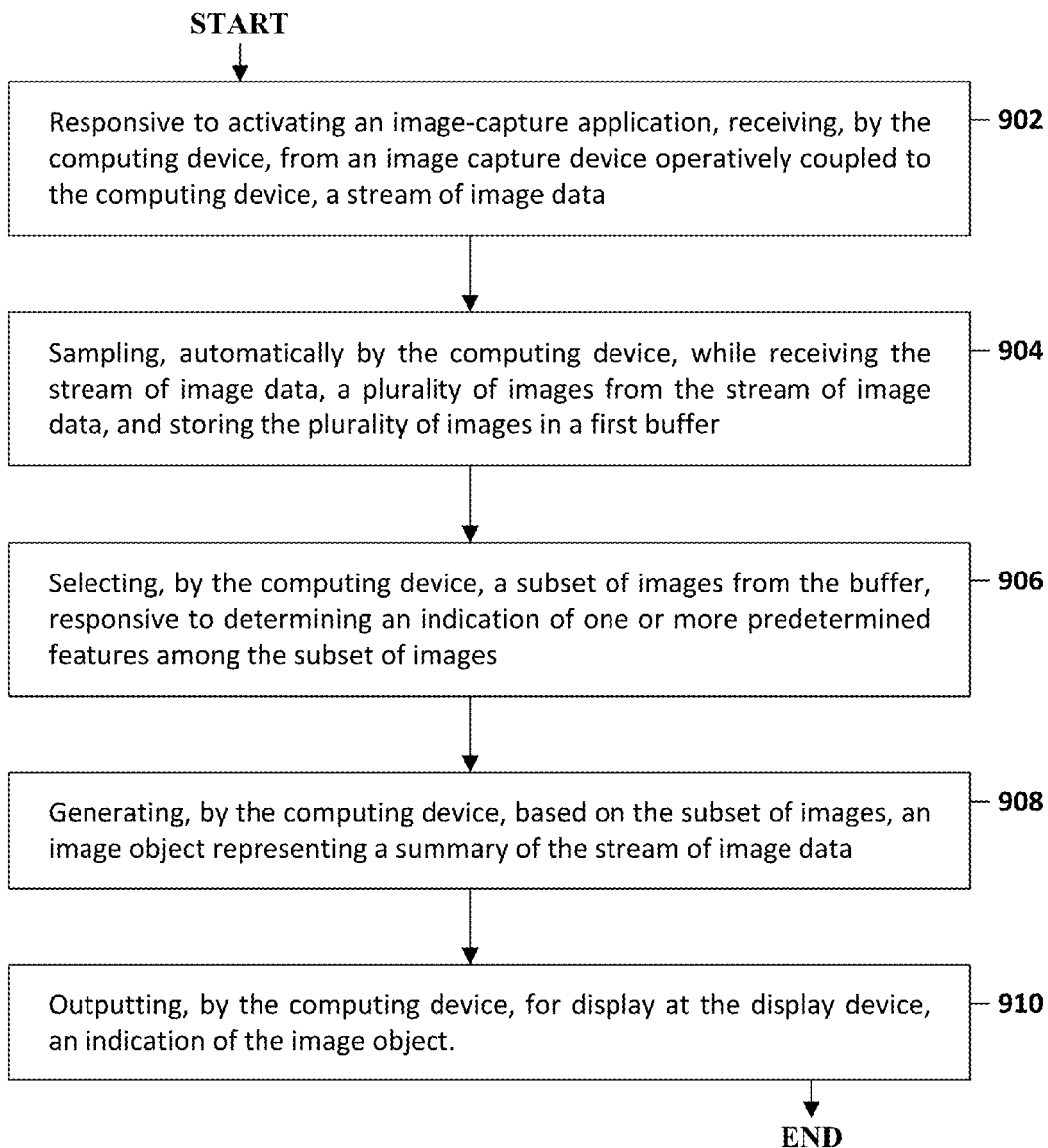
FIG. 9 depicts a flow diagram of a method 900 for autonomously collecting image data and generating photo summaries based thereon, according to an example implementation.

FIG. 9 depicts a flow diagram of a method 900 for autonomously collecting image data and generating photo summaries based thereon, according to an example implementation. As shown in FIG. 9, the method 900 starts in block 902, and, according to an example implementation, includes responsive to activation of an image-capture application, receiving, by a computing device, from an image capture device, a live stream of image data. In block 904, the method 900 includes storing, autonomously by the computing device, in a first buffer, while receiving the live stream of image data, a set of images based on the live stream of image data. In block 906, the method 900 includes identifying, by the computing device, one or more predetermined features among a subset of the set of images. In block 908, the method 900 includes generating, by the computing device, based on the subset of images, an image object representing a summary of the stream of image data. In block 910, the method 900 includes outputting, by the computing device, for display at the display device, an indication of the image object.

Figure 10:
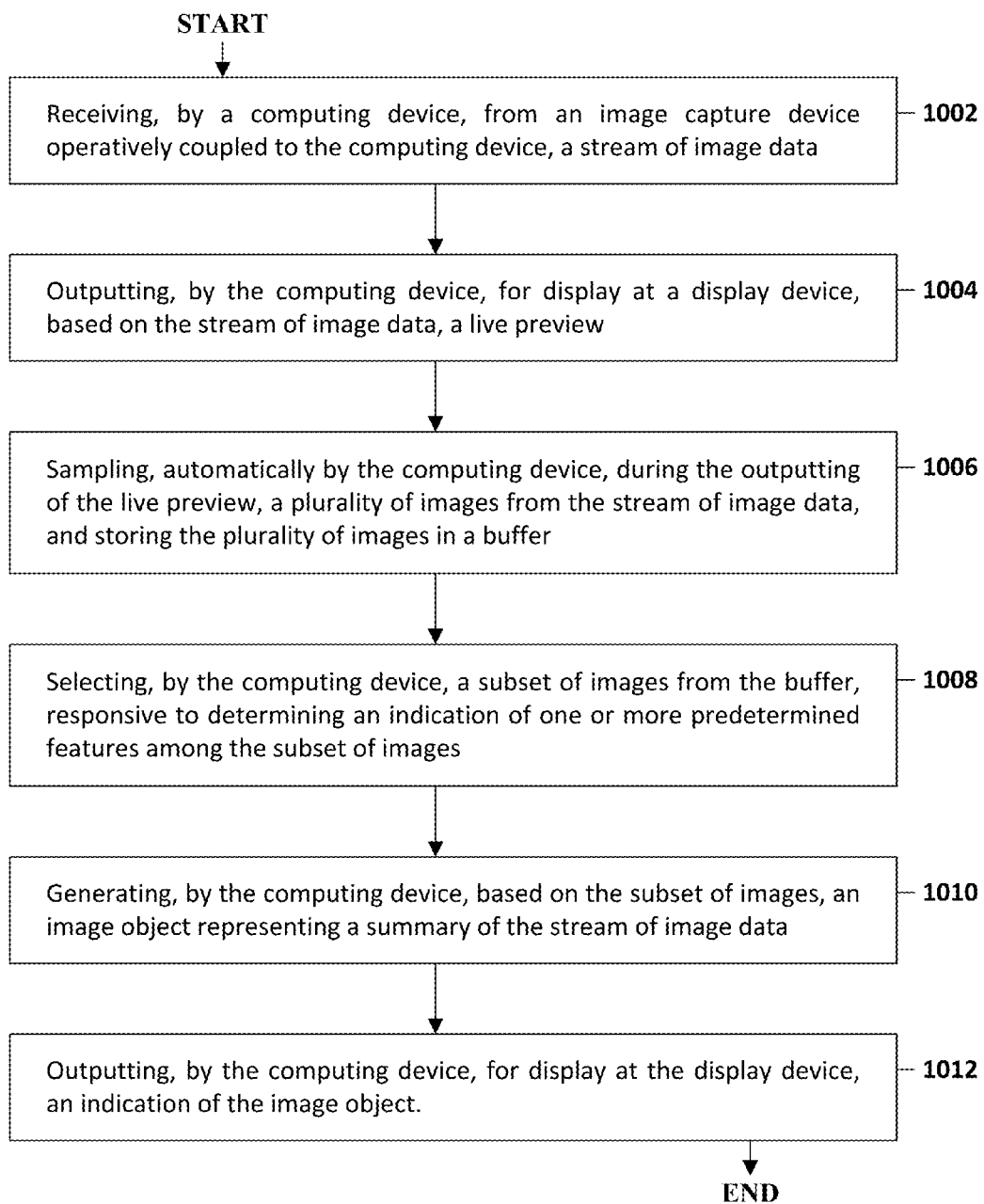
FIG. 10 depicts a flow diagram of another method 1000 for autonomously collecting image data and generating photo summaries based thereon, according to an example implementation.

FIG. 10 depicts a flow diagram of another method 1000 for autonomously collecting image data and generating photo summaries based thereon, according to an example implementation. As shown in FIG. 10, the method 1000 starts in block 1002, and, according to an example implementation, includes receiving, by a computing device, from an image capture device, a stream of image data. In block 1004, the method 1000 includes outputting, by the computing device, for display at a display device, a live preview based on the stream of image data. In block 1006, the method 1000 includes sampling, automatically by the computing device, during the outputting of the live preview, a set of images from the stream of image data, and storing the set of images in a first buffer. In block 1008, the method 1000 includes identifying, by the computing device, one or more predetermined features among a subset of the set of images. In block 1010, the method 1000 includes generating, by the computing device, based on the subset of images, an image object representing a summary of the stream of image data. In block 1012, the method 1000 includes outputting, by the computing device, for display at the display device, an indication of the image object.

It will be understood that the various steps shown in FIGS. 9-10 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
responsive to activation of an image-capture application, receiving, by a computing device, from an image capture device, a live stream of image data;
storing, autonomously by the computing device, in a first buffer, while receiving the live stream of image data, a set of images based on the live stream of image data;
selecting, by the computing device, a subset of images from the set of images stored in the first buffer to include as part of an image object representing a summary of the live stream of image data based on a determination that at least one image in the subset of images exceeds a predetermined sharpness threshold;
generating, by the computing device, based on the subset of the set of images, the image object representing the summary of the live stream of image data; and
outputting, by the computing device, for display at a display device, an indication of the image object.

2. The method of claim 1, further comprising:
identifying, by the computing device, one or more predetermined features among the subset of the set of images;
wherein the one or more predetermined features among the subset of images includes at least one of sharpness, presence of faces, facial expressions, illumination quality, image saliency, motion saliency, and color diversity.

3. The method of claim 1, wherein the subset of images is stored in a second buffer, and responsive to a number or size of images in the subset of images reaching a predetermined threshold, determining, based on predetermined criteria, a least important image in the subset of images to the summary of the stream of image data, and removing the least important image from the subset of images to provide room for a new image to be added to the subset of images.

4. The method of claim 2, wherein:
storing the set of images in the first buffer comprises storing, at a first resolution, a first image of the set of images; and
wherein identifying the of one or more predetermined features among the subset of images is based on analyzing a version of at least one image of the subset of images at a second resolution less than a first resolution.

5. The method of claim 1, wherein the autonomously storing is automatically initiated responsive to activating an image-capture application.

6. The method of claim 1, wherein the first buffer is a circular buffer, and the stream of image data exceeds a size of the circular buffer.

7. The method of claim 6, wherein the size of the circular buffer corresponds to approximately three seconds or less of the stream of image data.

8. A computer program product comprising a non-transitory computer readable medium that stores instructions that, when executed by a computing device, cause the computing device to perform a method comprising:

receiving, by the computing device, from an image capture device, a stream of image data;

outputting, by the computing device, for display at a display device, a live preview based on the stream of image data;

storing, autonomously by the computing device, in a first buffer, during the outputting of the live preview, a set of images from the stream of image data;

selecting, by the computing device, a subset of images from the set of images stored in the first buffer to include as part of an image object representing a summary of the live stream of image data based on a determination that at least one image in the subset of images exceeds a predetermined sharpness threshold;

generating, by the computing device, based on the subset of images, the image object representing the summary of the stream of image data; and outputting, by the computing device, for display at the display device, an indication of the image object.

9. The computer program product of claim 8, wherein the outputting of the indication of the image object is responsive to stopping the outputting of the live preview.

10. The computer program product of claim 8, wherein the outputting of the indication of the image object is responsive to receiving user input corresponding to an image capture command.

11. The computer program product of claim 8, wherein the autonomously storing is initiated responsive to receiving first user input corresponding to an image-capture command.

12. The computer program product of claim 11, wherein the autonomously storing is concluded responsive to receiving second user input corresponding to an image-capture command.

13. A system comprising:

a computing device;

an image capture device in communication with the computing device;

at least one memory operatively coupled to the computing device and configured for storing data and instructions that, when executed by the computing device, cause the computing device to perform a method comprising:

receiving, by a computing device, from an image capture device, a stream of image data;

outputting, by the computing device, for display at a display device, a live preview based on the stream of image data;

sampling, automatically by the computing device, during the outputting of the live preview, a set of images from the stream of image data, and storing the set of images in a first buffer;

selecting, by the computing device, a subset of images from the set of images stored in the first buffer to include as part of an image object representing a summary of the live stream of image data based on a determination that at least one image in the subset of images exceeds a predetermined sharpness threshold;

generating, by the computing device, based on the subset of images, the image object representing the summary of the stream of image data; and outputting, by the computing device, for display at the display device, an indication of the image object.

14. The method of claim 13, wherein a rate of the sampling is based on a running measure of motion associated with a plurality of images previously sampled from the image stream.

15. The method of claim 14, wherein the rate of the sampling is proportional to an integral of the running measure of motion.

16. The system of claim 15, wherein the image object is at least partially embodied in an animation.

17. The system of claim 16, wherein the generating the image object is based on determining the subset of images exceeds at least one of a predetermined blurriness threshold and predetermined specific motion threshold.

18. The system of claim 15, wherein the image object is at least partially embodied in a concurrent display of a plurality of still images.

19. The system of claim 13, wherein the generating the image object is further based on determining the subset of images exceeds a predetermined general motion threshold.

20. The system of claim 15, wherein the image object comprises a single image.

* * * * *